United States Patent
Parkinson et al.

(10) Patent No.: US 8,539,490 B2
(45) Date of Patent: Sep. 17, 2013

(54) SYSTEM AND METHOD FOR PROVIDING DYNAMIC TRANSACTION OPTIMIZATIONS

(75) Inventors: Paul Parkinson, Wenonah, NJ (US); Charles Paclat, Cape Elizabeth, ME (US)

(73) Assignee: Oracle International Corporation, Redwood Shores, CA (US)

( * ) Notice: Subject to any disclaimer, the term of this patent is extended or adjusted under 35 U.S.C. 154(b) by 195 days.

(21) Appl. No.: 13/188,289

(22) Filed: Jul. 21, 2011

(65) Prior Publication Data

US 2013/0024863 A1    Jan. 24, 2013

(51) Int. Cl.
*G06F 9/46* (2006.01)

(52) U.S. Cl.
USPC .......................................................... 718/101

(58) Field of Classification Search
USPC .......................................................... 718/101
See application file for complete search history.

(56) References Cited

U.S. PATENT DOCUMENTS

| | | | | |
|---|---|---|---|---|
| 6,154,878 | A | * | 11/2000 | Saboff ........................... 717/173 |
| 7,337,188 | B2 | * | 2/2008 | Somogyi et al. ...................... 1/1 |
| 2004/0015930 | A1 | * | 1/2004 | Wu ................................ 717/158 |
| 2004/0117609 | A1 | * | 6/2004 | Stalker et al. ...................... 713/2 |
| 2004/0210899 | A1 | * | 10/2004 | Somogyi ........................ 718/100 |
| 2007/0239719 | A1 | * | 10/2007 | Cotner et al. ..................... 707/8 |
| 2008/0320020 | A1 | * | 12/2008 | Ramidi ......................... 707/101 |

* cited by examiner

*Primary Examiner* — Emerson Puente
*Assistant Examiner* — Steven Do
(74) *Attorney, Agent, or Firm* — Fleisler Meyer LLP (57) ABSTRACT

A system and method for providing dynamic transaction optimizations, such as dynamic XA transaction optimizations. In accordance with an embodiment, the system enables monitoring of transactional behavior in an application during runtime, in order to provide a feedback loop. The application/transaction information in the feedback loop can be analyzed by a transaction manager to determine an indication as to whether a particular optimization, such as an isSameRM optimization, will provide a benefit or not. The optimization can then be applied accordingly. In accordance with various embodiments, such determination can be made transparently, so that its enablement is not detectable to, e.g., an end-application, or a system administrator, even though the distribution and type of XA calls may be detected through system monitoring. The feature can be used to improve the performance of transaction processing in a transaction-based system.

17 Claims, 5 Drawing Sheets

SYSTEM AND METHOD FOR PROVIDING DYNAMIC TRANSACTION OPTIMIZATIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to distributed transaction processing, and is particularly related to a system and method for providing dynamic transaction optimizations, such as dynamic XA transaction optimizations.

BACKGROUND

In the field of distributed transaction processing, the XA specification promulgated by The Open Group can be used to describe a protocol and interface between a transaction manager and one or more local resource managers. This enables a plurality of resources, such as application servers and databases, to be accessed within the same transaction, thus preserving the ACID (atomicity, consistency, isolation, durability) properties of the transaction.

The XA protocol supports a variety of optimizations that can be optionally employed depending on the needs of a particular implementation. For example, an IsSameRM optimization can be used in instances where multiple connections that are being used in the same transaction, and that point to the same resource manager (e.g., the same database), can be joined in order to avoid the need for certain XA protocol network calls. Since such XA calls constitute a performance detriment, and may also necessitate additional assets, joining connections can sometimes provide performance benefits.

However, a shortcoming with some optimizations, such as the IsSameRM optimization, is that the optimization can itself be a performance detriment depending on the amount of context switching that must then take place within the application. In many instances, it is not possible to know ahead of time whether such context switching will occur, in order to best determine whether the isSameRM optimization should be employed. As a result, optimizations such as the IsSameRM/join optimization are rarely, if ever used, and indeed in many systems are disabled by default. These are the general areas that embodiments of the invention are intended to address.

SUMMARY

Disclosed herein is a system and method for providing dynamic transaction optimizations, such as dynamic XA transaction optimizations. In accordance with an embodiment, the system enables monitoring of transactional behavior in an application during runtime, in order to provide a feedback loop. The application/transaction information in the feedback loop can be analyzed by a transaction manager to determine an indication as to whether a particular optimization, such as an isSameRM optimization, will provide a benefit or not. The optimization can then be applied accordingly. In accordance with various embodiments, such determination can be made transparently, so that its enablement is not detectable to, e.g., an end-application, or a system administrator, even though the distribution and type of XA calls may be detected through system monitoring. The feature can be used to improve the performance of transaction processing in a transaction-based system.

DETAILED DESCRIPTION

As described above, specifications such as the XA specification can be used to describe a protocol and interface between a transaction manager and one or more local resource managers, which enables a plurality of resources, such as application servers and databases, to be accessed within the same transaction. The XA protocol supports a variety of optimizations that can be optionally employed depending on the needs of a particular implementation. For example, an IsSameRM optimization can be used in instances where multiple connections that are being used in the same transaction, and that point to the same resource manager (e.g., the same database), can be joined in order to avoid the need for certain XA protocol network calls. However, a shortcoming with some optimizations, such as the IsSameRM optimization, is that the optimization can itself be a performance detriment depending on the amount of context switching that must then take place within the application. In many instances, it is not possible to know ahead of time whether such context switching will occur, in order to best determine whether the isSameRM optimization should be employed.

To address this, disclosed herein is a system and method for providing dynamic transaction optimizations, such as dynamic XA transaction optimizations. In accordance with an embodiment, the system enables monitoring of transactional behavior in an application during runtime, in order to provide a feedback loop. The application/transaction information in the feedback loop can be analyzed by a transaction manager to determine an indication as to whether a particular optimization, such as an isSameRM optimization, will provide a benefit or not. The optimization can then be applied accordingly. In accordance with various embodiments, such determination can be made transparently, so that its enablement is not detectable to, e.g., an end-application, or a system administrator, even though the distribution and type of XA calls may be detected through system monitoring. The feature can be used to improve the performance of transaction processing in a transaction-based system.

Figure 1:
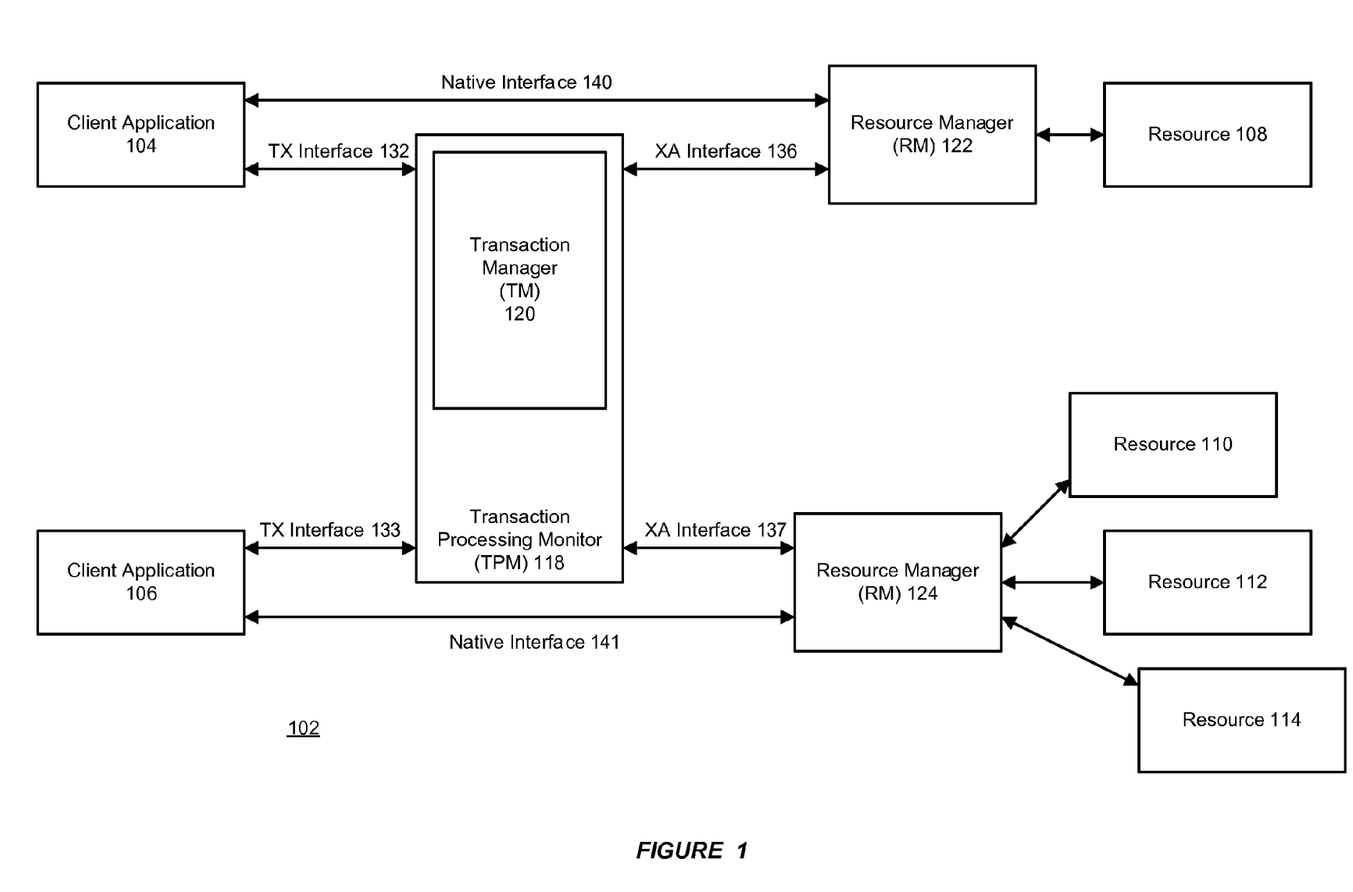
FIG. 1 illustrates a distributed transaction processing environment, in accordance with an embodiment.

FIG. 1 illustrates a distributed transaction processing environment 102, in accordance with an embodiment. As shown in FIG. 1, each of one or more resource managers (RM) 122, 124, controls access to one or more resources 108, 110, 112, 114. Examples of resources can include application servers, relational databases, and transactional file systems. A distributed transaction is one that includes updates to multiple resources—the transaction comprises multiple branches, each of which is a unit of work contained within an RM. A transaction processing monitor (TPM) 118 coordinates the flow of transaction requests between client applications 104, 106 that issue requests, and resources that will be used to process those requests, including synchronizing any commits or rollbacks required to complete the transaction. Examples of commercially available TPM s include Tuxedo, Weblogic and other application server-type systems.

A transaction manager (TM) component 120 of the TPM provides an application programming interface (in XA-based environments the XA protocol and its TX interfaces 132, 133) that enable the client application to specify the boundaries of the transaction. Each TM implements a two-phase commit protocol to provide all-or-none semantics across its distributed RMs. During a prepare phase, the TM uses its XA interface 136, 137 to ask each RM to guarantee that it can commit its part of the transaction. If this is possible, then the RM records its prepared state and replies affirmatively to the TM; if not then the RM might roll back any work and reply negatively to the TM. The XA protocol allows the client application, or any of the RMs, to roll back the transaction unilaterally until the prepare phase completes. During a commit phase, the TM records the commit decision and issues either a commit or rollback to all RMs participating in the transaction. The TM can issue a commit for an RM only if all of the RMs participating in the transaction have replied affirmatively during the prepare phase.

Although the client application can specify the transaction boundaries and the actions that constitute a transaction, the client application otherwise operates on each RM through its native interface 140, 141. For example, in the case of a SQL-based database resource, the client application might operate on the database's RM using SQL commands. This means that the client application can start and complete all transaction control operations through the TX interface, and does not directly use the XA interface, which allows the client applications to leave the management of the inner working of the branches to the TM.

Figure 2:
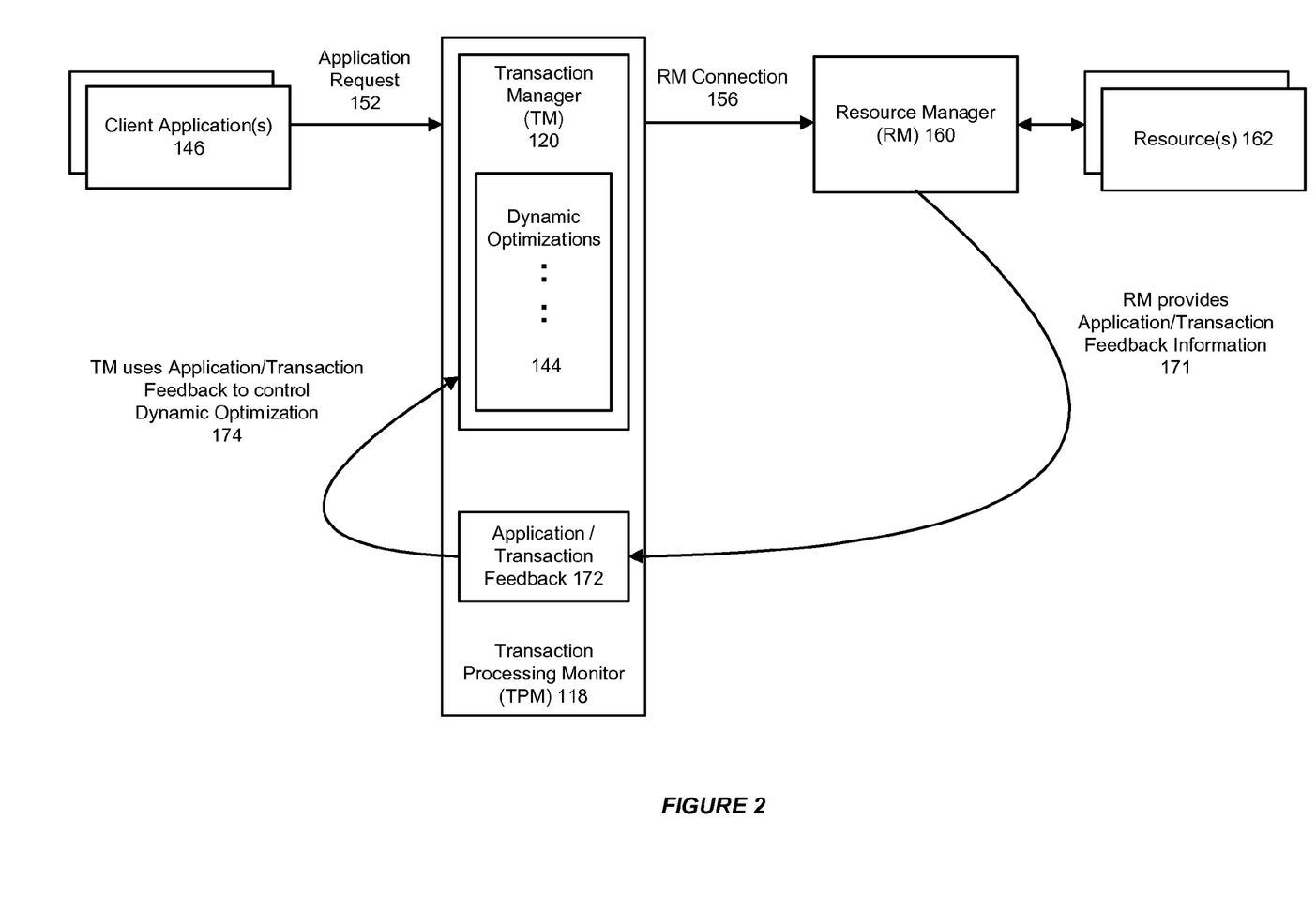
FIG. 2 illustrates a system for providing dynamic transaction optimizations, in accordance with an embodiment.

FIG. 2 illustrates a system for providing dynamic transaction optimizations, in accordance with an embodiment. As shown in FIG. 2, one or more client applications 146 can issue transaction requests to the transaction manager at the transaction processing monitor, wherein the transaction includes updates via connections 156 to one or more distributed resources 162. In accordance with an embodiment, the transaction manager 120 includes one or more dynamic optimizations, i.e., transaction processing optimizations that can be dynamically enabled and/or disabled at runtime in response to application/transaction feedback information from the resource managers. As the resource manager processes each transaction, application/transaction feedback information 171 is continuously fed back to the transaction manager and/or the transaction processing monitor (i.e., as a feedback loop). The application/transaction feedback stored at the transaction manager and/or the transaction processing monitor can be later used to determine an indication as to whether a particular dynamic optimization, such as an isSameRM optimization, will provide a benefit or not, and in which circumstances. This determination is then used to control 174 (e.g., to explicitly enable or disable) that dynamic optimization.

In accordance with various embodiments, the application/transaction feedback information can be provided directly to the transaction manager for use by that transaction manager only; or alternatively can be provided to the transaction processing system for use by several transaction managers at that system.

In accordance with various embodiments, the feedback information can be stored only in transient memory for use by the transaction manager for the duration of its uptime; or alternatively can be persisted for use by the transaction manager after a reboot.

In accordance with various embodiments, enabling and/or disabling a particular optimization does not necessarily mean the optimization will be used in every instance, only that it is available (or not available) for use, subject to other runtime conditions.

Alternative variations of the above may be used, depending the needs of a particular implementation.

Figure 3:
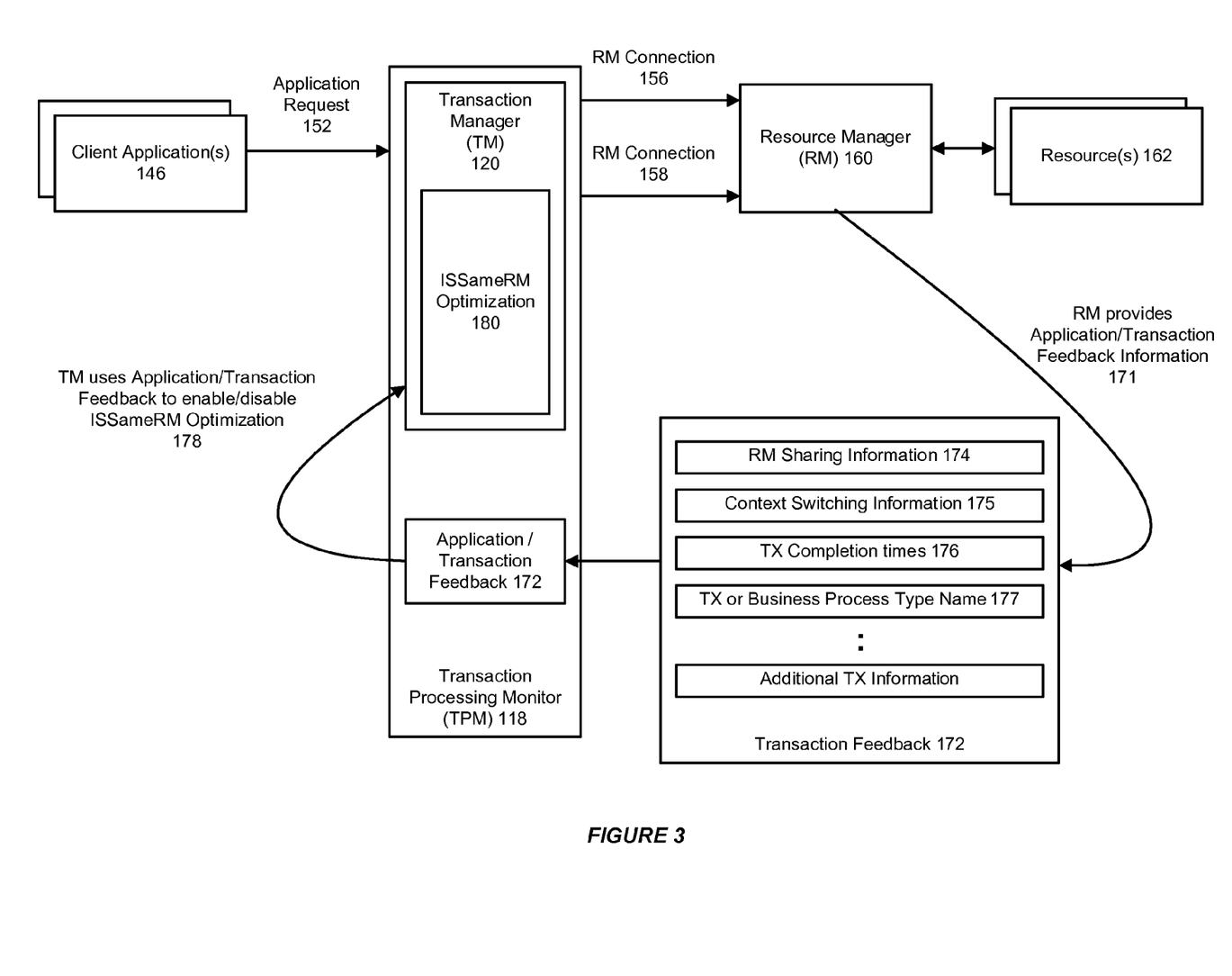
FIG. 3 further illustrates a system for providing dynamic transaction optimizations, including a dynamic IsSameRM optimization, in accordance with an embodiment.

FIG. 3 further illustrates a system for providing dynamic transaction optimizations, including a dynamic IsSameRM optimization, in accordance with an embodiment. As described previously, the XA protocol supports a variety of optimizations that can be optionally employed depending on the needs of a particular implementation. For example, an IsSameRM optimization can be used in instances where multiple connections that are being used in the same transaction, and that point to the same resource manager (e.g., the same database), can be joined in order to avoid the need for certain XA protocol network calls:

```
isSameRM
    public boolean isSameRM(XAResource xares)
        throws XAException
``` wherein xares is an XAResource object whose resource manager instance is to be compared with the resource manager instance of the target object; the method returns True if it is the same RM instance; otherwise false; and the method throws an XAException if an error has occurred, possible values are XAER_RMERR and XAER_RMFAIL.

The IsSameRM method can be called to determine if the resource manager instance represented by the target object is the same as the resource manager instance represented by the parameter xares—if the resource manager instances are indeed the same, then the transaction manager can join the calls. However, since the IsSameRM optimization can itself be a performance detriment depending on the amount of context switching that must then take place within the application, it is difficult to know in which instances the optimization should be employed.

As shown in FIG. 3, in accordance with an embodiment, one or more client applications can issue transaction requests to the transaction manager at the transaction processing monitor, wherein the transaction includes updates via a plurality of connections 156, 158 to one or more distributed resources. In this example, the transaction manager includes as a dynamic optimization the IsSameRM optimization 180, i.e., the IsSameRM optimization can be dynamically enabled and/or disabled at runtime in response to application/transaction feedback information from the resource managers. As the resource manager processes each transaction, application/transaction feedback information 171 is continuously fed back to the transaction manager and/or the transaction processing monitor, where it is used determine whether the isSameRM optimization will provide a benefit or not, and in which circumstances, and to control 178 (e.g., to explicitly enable or disable) the availability of the IsSameRM optimization. Enabling the availability of the IsSameRM optimization does not necessarily mean the optimization will be used in every instance, only that it is available for use, subject to other runtime conditions.

In accordance with an embodiment, the application/transaction feedback information can include such information as RM sharing information 174, context switching information 175, transaction completion times 176, transaction or business process type name 177, and/or other additional or alternative application/transaction information depending on the needs of a particular implementation. This enables the transaction manager to determine, e.g., those types of transaction, or those business processes whose performance would benefit (or not benefit) from the use of the IsSameRM optimization.

Figure 4:
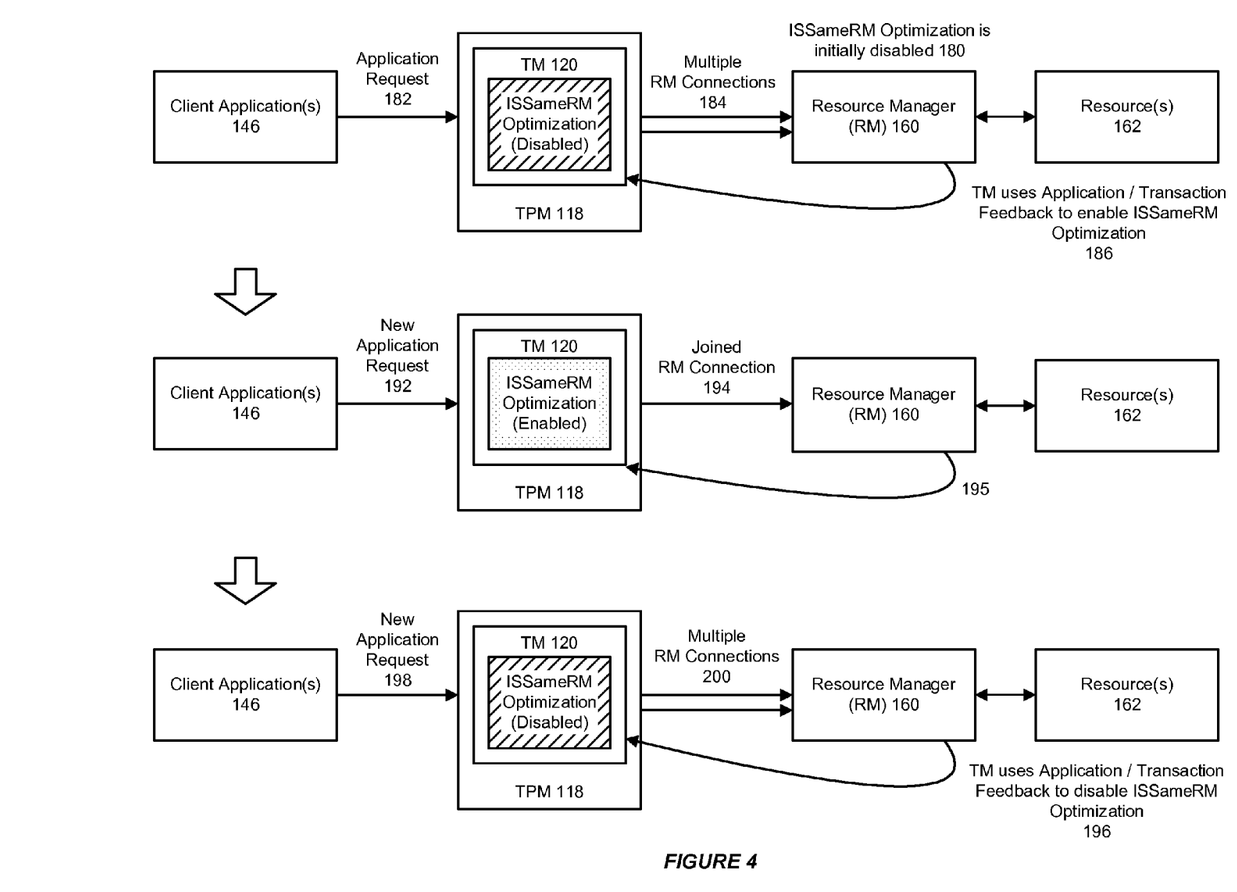
FIG. 4 illustrates a use of a system for providing dynamic transaction optimizations, in accordance with an embodiment.

FIG. 4 illustrates a use of a system for providing dynamic transaction optimizations, in accordance with an embodiment. As shown in FIG. 4, the one or more client applications can issue requests to the transaction manager at the transaction processing monitor, wherein the transaction includes updates via connections to one or more distributed resources. At a first period in time, the dynamic optimization (e.g., the IsSameRM optimization) is disabled 180, such that for a particular application request 182, multiple connections 184 may be required to the same resource manager. As the resource manager processes each transaction, application/transaction feedback information 186 is continuously fed back to the transaction manager and/or the transaction processing monitor, where it is used determine whether the isSameRM optimization will provide a benefit or not, and in which circumstances, and to explicitly enable or disable the IsSameRM optimization.

At a later period in time, it may be determined, based on the continuing application/transaction feedback information 195 received, and the particular circumstances of a new application request 192, that the isSameRM optimization would provide a benefit for that request. The IsSameRM optimization is then enabled, such that multiple connections to the same resource manager can be joined 194.

At a yet later period in time, it may be determined, based on the continuing application/transaction feedback information 196 received, and the particular circumstances of another new application request 198, that the isSameRM optimization would provide no benefit (or indeed may provide a detriment) for that request. The IsSameRM optimization is then disabled, such that multiple connections 200 must again be maintained to the same resource manager.

Figure 5:
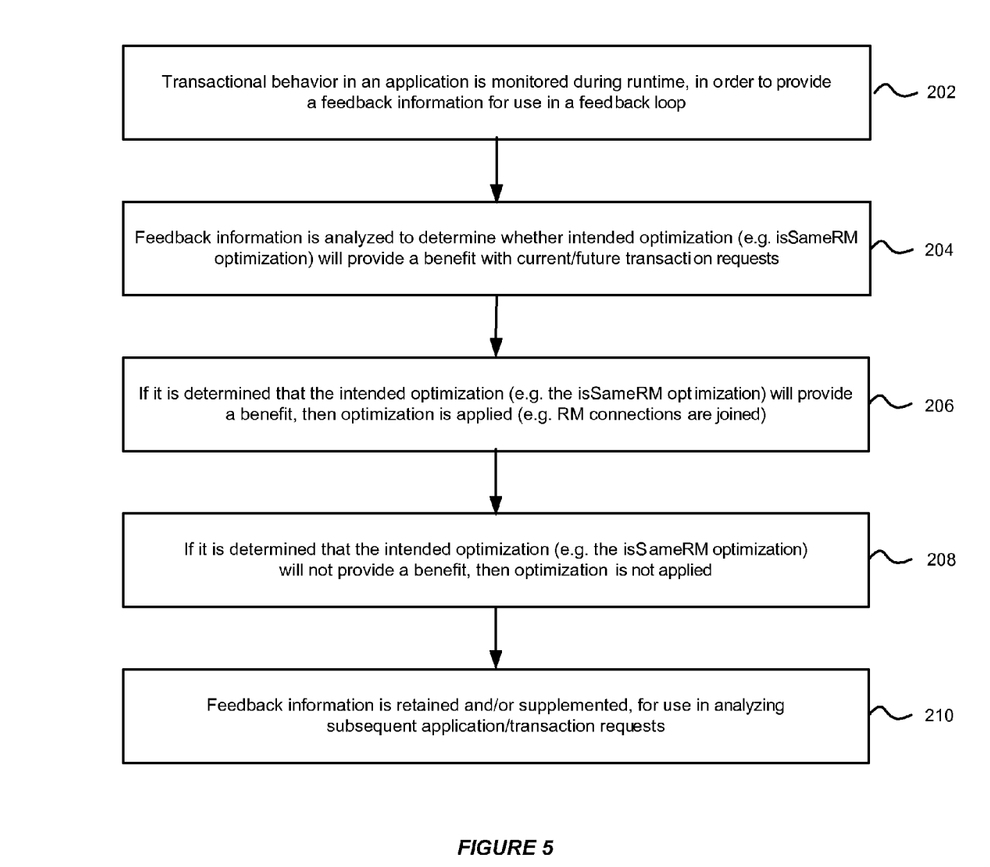
FIG. 5 shows a flowchart of a method for providing dynamic transaction optimizations, in accordance with an embodiment.

FIG. 5 shows a flowchart of a method for providing dynamic transaction optimizations, in accordance with an embodiment. As shown in FIG. 5, at step 202, the transactional behavior in an application is monitored during runtime, in order to provide a feedback information for use in a feedback loop. At step 204, the feedback information is analyzed by the transaction manager to determine whether the intended dynamic optimization (e.g., the isSameRM optimization) will provide a benefit with a current or future transaction request. At step 206, if it is determined that the intended optimization (e.g., the isSameRM optimization) will provide a benefit, then the optimization is applied (e.g., RM connections are joined where appropriate). At step 208, if it is determined that the intended optimization (e.g., the isSameRM optimization) will not provide a benefit, then the optimization is not applied. At step 210, the feedback information is retained and/or supplemented, for use in analyzing subsequent application/transaction requests. In accordance with various embodiments, the feedback information can be stored only in transient memory for use by the transaction manager for the duration of its uptime; or alternatively can be persisted for use by the transaction manager after a reboot.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for providing dynamic transaction optimizations in a distributed transaction process, comprising:
  a computing device which includes a processor and a transaction processing system for processing transaction requests received from one or more client applications, the transaction processing system comprising:
  one or more resource managers which control access to one or more resources;
  one or more transaction managers which receive the transaction requests from the client applications and provide connections to the resource managers to enable the resources to be updated; and
  one or more dynamic optimizations which can be dynamically enabled or disabled by the transaction managers at runtime in response to application/transaction feedback information from the resource managers;
  wherein the resource managers continuously provide the application/transaction feedback information to the transaction managers to determine whether a particular dynamic optimization will provide a benefit or not, and in which circumstances; and
  wherein the transaction manager explicitly enable or disable the particular dynamic optimization based on the determination.

2. The system of claim 1, wherein the transaction manager is an XA transaction manager, and the one or more resource managers are XA resource managers.

3. The system of claim 2, wherein the dynamic optimization includes an isSameRM optimization, and wherein the application/transaction feedback information is used by the transaction manager to explicitly enable or disable the availability of the isSameRM optimization for application requests.

4. The system of claim 1, wherein the application/transaction feedback information is stored only in transient memory for use by the transaction manager for the duration of its uptime.

5. The system of claim 1, wherein the application/transaction feedback information is persisted for use by the transaction manager after a reboot.

6. The system of claim 1, further comprising one or more transaction processing monitors which coordinate the transaction requests between the client applications and the resources.

7. The system of claim 6, wherein the transaction processing monitors include the transaction managers.

8. A method for providing dynamic transaction optimizations in a distributed transaction process, comprising the steps of:
providing a computing device which includes a processor and a transaction processing system for processing transaction requests received from one or more client applications;
providing one or more resource managers which control access to one or more resources;
providing one or more transaction managers which receive the transaction requests from the client applications and provide connections to the resource managers to enable the resources to be updated; and
providing one or more dynamic optimizations which can be dynamically enabled or disabled by the transaction managers at runtime in response to application/transaction feedback information from the resource managers;
wherein the resource managers continuously provide the application/transaction feedback information to the transaction managers to determine whether a particular dynamic optimization will provide a benefit or not, and in which circumstances; and
wherein the transaction manager explicitly enable or disable the particular dynamic optimization based on the determination.

9. The method of claim 8, wherein the transaction manager is an XA transaction manager, and the one or more resource managers are XA resource managers.

10. The method of claim 9, wherein the dynamic optimization includes an isSameRM optimization, and wherein the application/transaction feedback information is used by the transaction manager to explicitly enable or disable the availability of the isSameRM optimization for application requests.

11. The method of claim 8, wherein the application/transaction feedback information is stored only in transient memory for use by the transaction manager for the duration of its uptime.

12. The method of claim 8, wherein the application/transaction feedback information is persisted for use by the transaction manager after a reboot.

13. A non-transitory computer readable storage medium, including instructions stored thereon, which when read and executed by one or more computers, cause the one or more computers to perform the steps comprising:
providing a computing device which includes a processor and a transaction processing system for processing transaction requests received from one or more client applications;
providing one or more resource managers which control access to one or more resources;
providing one or more transaction managers which receive the transaction requests from the client applications and provide connections to the resource managers to enable the resources to be updated; and
providing one or more dynamic optimizations which can be dynamically enabled or disabled by the transaction managers at runtime in response to application/transaction feedback information from the resource managers;
wherein the resource managers continuously provide the application/transaction feedback information to the transaction managers to determine whether a particular dynamic optimization will provide a benefit or not, and in which circumstances; and
wherein the transaction manager explicitly enable or disable the particular dynamic optimization based on the determination.

14. The non-transitory computer readable storage medium of claim 13, wherein the transaction manager is an XA transaction manager, and the one or more resource managers are XA resource managers.

15. The non-transitory computer readable storage medium of claim 14, wherein the dynamic optimization includes an isSameRM optimization, and wherein the application/transaction feedback information is used by the transaction manager to explicitly enable or disable the availability of the isSameRM optimization for application requests.

16. The non-transitory computer readable storage medium of claim 13, wherein the application/transaction feedback information is stored only in transient memory for use by the transaction manager for the duration of its uptime.

17. The non-transitory computer readable storage medium of claim 13, wherein the application/transaction feedback information is persisted for use by the transaction manager after a reboot.

* * * * *

UNITED STATES PATENT AND TRADEMARK OFFICE
CERTIFICATE OF CORRECTION

PATENT NO. : 8,539,490 B2  
APPLICATION NO. : 13/188289  
DATED : September 17, 2013  
INVENTOR(S) : Parkinson et al.

Page 1 of 1

It is certified that error appears in the above-identified patent and that said Letters Patent is hereby corrected as shown below:

On the Title Page
Item (74) Attorney, Agents or Firms, line 1, delete "Fleisler Meyer LLP" and insert -- Fliesler Meyer LLP --, therefor.

Signed and Sealed this
Tenth Day of December, 2013

Margaret A. Focarino
*Commissioner for Patents of the United States Patent and Trademark Office*